Patented Sept. 19, 1950

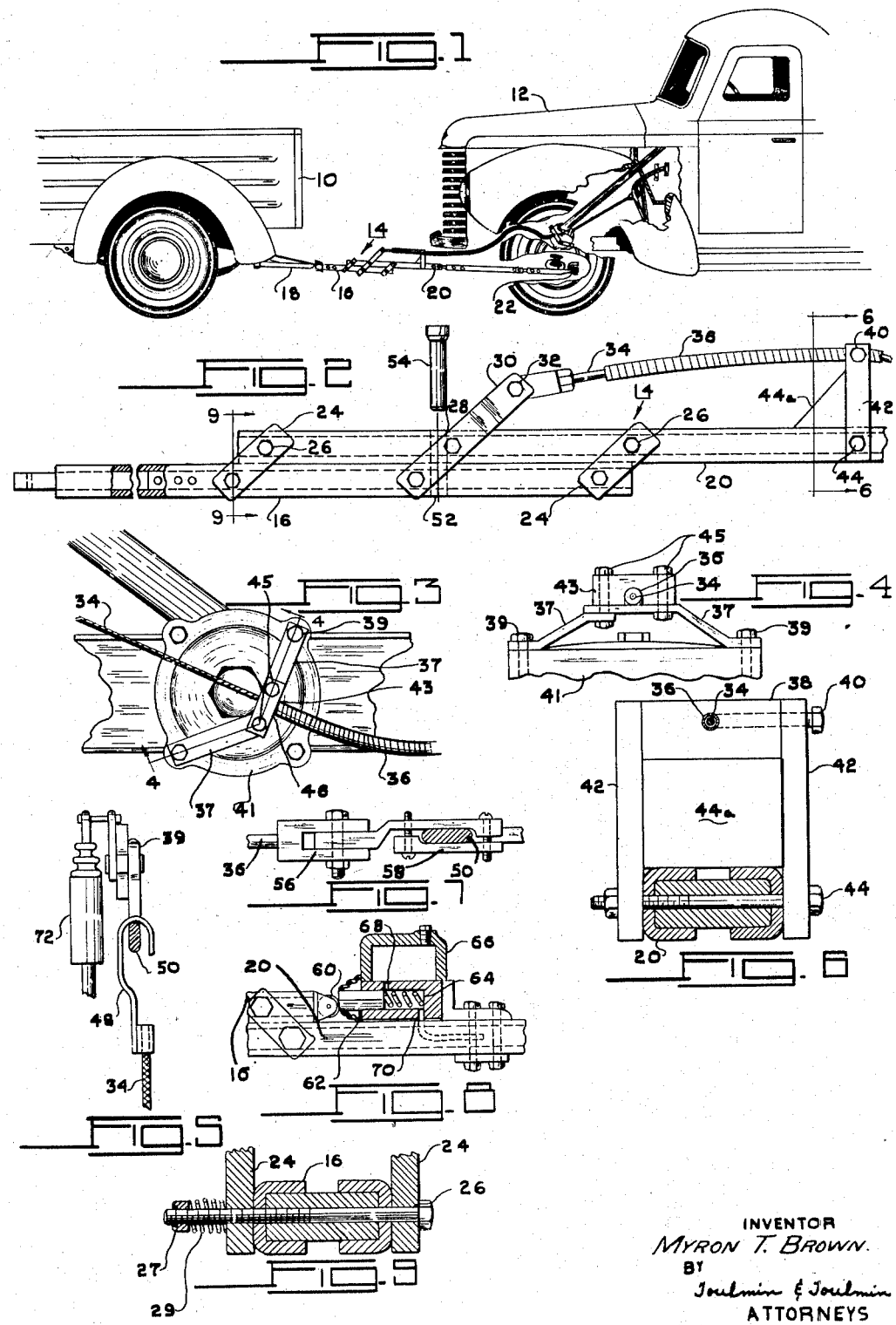

2,522,855

UNITED STATES PATENT OFFICE 2,522,855

TOW-BAR BRAKE ACTUATOR

Myron T. Brown, Springfield, Ohio, assignor of one-half to George Miller, Springfield, Ohio Application December 23, 1947, Serial No. 793,438

6 Claims. (Cl. 188—112)

This invention relates to braking systems, and particularly to systems for actuating the brakes of a towed vehicle.

In the transporting of new cars and trucks from the factory to the market one of the preferred arrangements is by means of towing one new truck or car by means of another.

In the case of trucks it is sometimes possible not only to tow one new truck by another but to mount still a third truck on the back of the towing truck.

In either instance it is customary to interconnect the towed and towing vehicles by a tow bar which is so arranged that the steering wheels of the towed vehicle are connected with the bar to be turned thereby as the towing vehicle turns a corner.

This manner of transporting new vehicles is preferred over that of carrying them on trucks because it involves the smallest investment in equipment and is economical because the idle return trip involves only the time of the driver.

In a towed and towing vehicle arrangement as described above there is the disadvantage of adding considerable weight without increasing the braking capacity of the towing car. This makes the operation of the towing car extremely hazardous in certain circumstances such as on slippery pavements or when it is necessary to make sudden stops. In fact, because of the hazard due to this increased load placed on the braking capacity of the towing car, this method of transporting vehicles has fallen into some disfavor.

The primary object of the present invention is the provision of an arrangement for a towed and towing vehicle combination wherein the braking capacity of the combination is substantially equal to the sum of the braking capacities of the cars individually.

A further object is the provision of an arrangement for applying the brakes of a towed vehicle in response to the application of the brakes of a towing vehicle in order to prevent the towed vehicle from jack-knifing or slipping when the brakes of the towing vehicle are applied.

Still another object of this invention is to provide an arrangement in connection with a tow bar connecting towed and towing vehicles such that connection can be made with the brakes of the towed vehicle for application thereof when the brakes of the towing vehicle are applied, the connection to the brakes of the towing vehicle being accomplished without modifying the braking system thereof.

Another object of this invention is the provision of a kit which can be employed for converting a standard tow bar to an arrangement whereby the brakes of a towed vehicle connected therewith can be automatically applied when the said vehicle tends to run ahead toward the towing vehicle.

These and other objects and advantages will become more apparent upon reference to the following description taken in connection with the accompanying drawings in which:

Figure 1 is a side elevational view showing a towed and towing vehicle connected by a tow bar according to this invention and which is connected with the brake system of the towed vehicle;

Figure 2 is a somewhat enlarged view of the tow bar showing the flexible portion thereof which is connected with the brake system of the towed vehicle;

Figure 3 is a view showing how the end of the brake cable is attached in the engine compartment of the towed vehicle;

Figure 4 is a view indicated by the line 4—4 on Figure 3 and showing the cable anchor;

Figure 5 is a view showing how the brake cable is hooked to the pedal of the towed car;

Figure 6 is a vertical section indicated by the line 6—6 on Figure 2;

Figure 7 is a view similar to Figure 5 but showing a somewhat modified arrangement for making connection with the brake system of the towed vehicle;

Figure 8 shows a modification wherein this invention is adapted for displacing hydraulic fluid to a brake system; and Figure 9 is a section on the line 9—9 on Figure 2 and showing a spring arrangement for retaining parts of the device of this invention together.

Referring to Figure 1, the towing vehicle is indicated at 10 and the towed vehicle at 12. The vehicles are interconnected by a tow bar generally indicated at 14 and which has a fore part 16 connected with the rear end of the towing vehicle as at 18 and an aft part 20 which is connected with the towed vehicle as at 22 in the manner previously described.

Reference to Figure 2 will show that the fore and aft parts 16 and 20 are connected by a plurality of links or bars 24 which have their ends pivoted on the parts of the tow bar as by the bolts 26. These bars, of which there are two or more, include one elongated bar as at 28 which has an end part 30 projecting beyond the aft part of the tow bar 20 and pivotally connected as at 32 with a flexible cable 34.

The cable 34 comprises a portion of a substantially standard mechanical brake actuating cable which includes a cable housing 36. The end of the cable housing 36 is supported in a block 38 and is clamped therein as by a set screw 40. The block, in turn, includes a pair of depending side plates 42 which span the tow bar and which are secured thereto by a through bolt 44.

In order to provide for a substantially rigid anchor for the cable housing 36, the block 38 preferably has a brace member 44a secured to the forward side thereof and which bears against the upper part of the part 20 of the tow bar.

Inasmuch as braking systems in vehicles are ordinarily of the hydraulic type, it is preferable that the hydraulic portion of the braking system of the towed vehicle remain intact. Thus, the cable 34 and cable housing 36 extend backwardly beneath the front end of the towing car 12 and up through the splash pan and thence toward the floor boards adjacent the brake pedal. The rear end of the cable housing 36 is preferably anchored as indicated at 46 in Figure 3 as to the base of the steering column, but it will be understood that the anchoring of the said housing could be accomplished by securing it to the motor block, to the chassis of the vehicle, or to any other suitable stationary portion thereof sufficiently near the brake pedal.

The particular arrangement for securing the towed car end of the brake housing comprises a pair of bars 37 adapted for having one of their ends retained under the screws 39 which form a part of the housing 41 at the base of the steering column. One of these bars 37 carries a block 43 which is slotted as will be seen in Figure 4 to clamp therebeneath the end of the cable housing. A pair of bolts 45 secure the block 43 in cable clamping position and also connect the ends of the bars 37 together. This forms a rigid anchor for the towed car end of the cable clamp.

The end of the cable 34 within the towed vehicle preferably has a hook part 48 thereon which loops over the brake pedal 50. This arrangement will be seen in Figures 1 and 5.

It will be evident that the connection of the cable to the braking system of the towed vehicle has been accomplished without opening any of the hydraulic lines thereof or in any way disturbing the vehicle brakes. In the case of either hydraulic or mechanical brakes this is a distinct advantage, and is of especial benefit in the case of hydraulic brakes because it avoids any possibility of getting air into the hydraulic brake system. Also, it provides for a very quick and easy means of making connection with the brakes of the towed vehicle and permits the disconnection from the brake system to be made very quickly. Thus, the installation and removal of the entire tow bar mechanism can be made very quickly.

In general, it is not desirable to back up the arrangement as shown in Figure 1. However, should it become necessary, for any reason, to drive the cars in reverse the tow bar parts may be provided with the bored holes indicated at 52 through which a pin 54 can be dropped and which will prevent the operation of the brake applying mechanism during the time that the cars are being backed up.

Should it be desired to make a more rigid connection of the brake pedal 50 the arrangement shown in Figure 7 may be employed wherein the end of the cable 36 has a clevis 56 connected therewith and which is connected with the brake pedal 50 by the clamping arrangement 58. This effects a rigid connection between the cable and the brake pedal and eliminates any possibility that the cable will become disengaged from the pedal.

A somewhat modified arrangement of this invention is illustrated in Figure 8. In this figure the fore part 16 of the tow bar has mounted on the end thereof a roller 60 and abutting the roller 60 is a plunger 62 which reciprocates in a cylinder 64. The cylinder 64 corresponds with the master brake cylinder of hydraulic braking systems and is connected at one end with a reservoir 66 through a port 68, and at its other end through a conduit 70 with the hydraulic braking system of a towed vehicle or trailer. As mentioned before, the Figure 8 arrangement is not to be preferred in connection with towing new cars and trucks, but may be employed to advantage in connection with freight trailers and the like.

In connection with either of the arrangements described above, the operation is as follows:

The vehicles are connected with the tow bar in the usual manner and thereafter the cable and cable housing are passed beneath the front end of the towed vehicle and through the splash pan and the end of the cable is connected with the brake pedal. Then, the end of the cable housing within the towed vehicle is anchored in a position of adjustment which removes substantially all of the slack length from the brake cable. Thereafter, the towing of the vehicle is accomplished in the usual manner and during normal operation the adjacent faces of the parts of the tow bar abut and provide for a rigid mechanical connection between the vehicles. However, whenever the brakes are applied in the towing vehicle the towed vehicle will have a tendency to run ahead, and when this occurs the bars 24 and 28 will rotate in a counterclockwise direction as viewed in Figure 2 and pull the cable 34 through the cable housing 36. This will apply the brakes of the towed vehicle through the brake pedal 50 and whatever mechanism is employed for connecting the said brake pedal with the brakes.

In the drawings the brake pedal 50 is shown as connected with a master brake cylinder 72, but it will be understood that this invention is equally applicable to mechanical braking systems wherein rods, levers, or cables are employed for connecting the pedal with the brakes.

In any case, the brakes of the towed vehicle will be applied in direct proportion to its tendency to run ahead. This will remove all decelerating loads from the towing vehicle due to the towed vehicle except the force required to set the brakes through the cable 34. This being only a matter of a few pounds at most the operation of the towing vehicle will be substantially normal in all respects.

It will be seen that this invention provides for an improved tow bar arrangement for interconnecting vehicles which provides for greater safety of operation and at the same time permits very easy installation of the mechanism.

Tow bars of the type with which this invention is concerned generally consist of a pair of facing channels as will be noted in Figure 6 and which have spaced therealong blocks through which connectors pass which clamp the channels against the blocks. The tow bars are ordinarily made in parts and are adjustable in length by an adapter member secured therebetween.

Accordingly, this invention contemplates providing a kit for converting tow bars now in use to the improved brake actuating arrangement.

described herein. Thus, a standard tow bar construction can be modified by the addition thereto of the aforementioned bars, the anchor block for the end of the cable housing, the cable and cable housing, and connecting means for securing the end of the cable to the brake pedal. It will be seen that the conversion of a standard tow bar to a brake applying tow bar according to this invention is at one time simple and inexpensive. This makes the invention adaptable to present installations at a minimum of expense.

Should it be desirable to control the exact thrust on the tow bar which will actuate the brakes of the towed vehicle, and to provide for a connection between the fore and aft parts of the bar which will not become loose, the arrangement shown in Figure 9 may be utilized wherein each of the bolts 26 has a self locking nut as at 27 thereon and a resilient means such as the spring 29 bearing between the said nut and the adjacent one of the bars 24.

It will be apparent that once the nut 27 has been threaded on the end of the bolt 26 there will be no tendency for the nut to loosen and that the spring 29 will retain the bars 24 tightly against the sides of the tow bar parts at all times.

In connection with Figure 1 one of the advantages of the present invention will become apparent upon considering the operation of the braking system should the tow bar break at the rear of the towing vehicle. If this occurs the front end of the tow bar will drop to the ground or to the pavement and the frictional engagement of the end of the tow bar with the ground or pavement would bring about the actuation of the brakes of the towed vehicle and thereby cause it to come to a halt. Similarly, should the tow bar break in the aft part thereof, then the cable connected with the brake pedal of the rear car would tend to maintain a driving connection between the vehicles which would probably prevent the towed car from leaving the road before the leading car could be brought to a halt.

It will be obvious that these safety features are very desirable and have considerable merit.

It will be understood that this invention is susceptible to modification in order to adapt it to different usages and conditions and, accordingly, it is desired to comprehend such modifications within this invention as may fall within the scope of the appended claims.

I claim:

1. In combination; a tow bar comprising a fore part adapted for connection to a towing vehicle and an aft part adapted for connection to a towed vehicle, the adjacent ends of said parts overlapping, a plurality of links extending across the overlapped ends of said parts and pivoted to both thereof and one of said links extending substantially beyond one of its pivotal connections to form a lever which swings when said parts are moved toward each other, a flexible cable housing having one end anchored on said aft part and adapted for being passed into the towed vehicle to have its other end anchored therein, and a flexible cable passing through said housing and having one end connected with the end of said one link and its other end adapted for detachable connection with the braking system of the towed vehicle, the said other end of said cable including means adapted for connection with the brake pedal of the towed vehicle.

2. In combination; a tow bar comprising a fore part adapted for connection to a towing vehicle and an aft part adapted for connection to a towed vehicle, the adjacent ends of said parts overlapping, a plurality of links extending across the overlapped ends of said parts and pivoted to both thereof and one of said links extending substantially beyond one of its pivotal connections to form a lever which swings when said parts are moved toward each other, a flexible cable housing having one end anchored on said aft part and adapted for being passed into the towed vehicle to have its other end anchored therein, and a flexible cable passing through said housing and having one end connected with the end of said one link and its other end adapted for detachable connection with the braking system of the towed vehicle, the said other end of said cable including a hook adapted for engagement with the brake pedal of the towed vehicle.

3. In combination; a tow bar comprising a fore part adapted for connection to a towing vehicle and an aft part adapted for connection to a towed vehicle, the adjacent ends of said parts being superposed, a plurality of links extending across the overlapped ends of said parts and pivoted to both thereof, said links being of a length to be inclined somewhat rearwardly when the overlapped ends are in engagement, one of said links being extended substantially beyond its pivotal connection with one of said parts, an anchor block secured to the aft part of said bar, a flexible cable housing secured to said block and of a length to extend to adjacent the brake pedal of the towed vehicle, and a flexible cable passing through said housing and having one end secured to the end of said extended lever and being adapted at its other end for detachable connection with said brake pedal.

4. In combination; a tow bar comprising a fore part for connection to a towing vehicle and an aft part for connection to a towed vehicle, the adjacent ends of said parts being overlapping and superposed, a plurality of links extending across the overlapped ends of said parts and pivoted to both thereof, said links being of a length to be inclined rearwardly when said overlapped parts are in engagement, and one of said links being extended beyond its pivotal connection with one of said parts, an anchor block secured to said aft parts, a cable housing secured at one end of said anchor block and of a length to extend to within the towed vehicle, a clamp on the said other end of said housing for securing the same within the towed vehicle, and a flexible cable extending through said housing, said cable having a clevis at one end for connection with the end of said extended lever and a hook on its other end for connection with the brake pedal of the towed vehicle.

5. In a kit for converting a tow bar comprising fore and aft parts to a tow bar-brake actuator, a plurality of links adapted for connection between the ends of said tow bar parts and including one elongated link, an anchor block adapted for mounting on the aft part of said bar and also adapted for receiving the end of a cable housing, a flexible drive including a housing having one end anchored in said block and a flexible cable extending therethrough, means at one end of said cable for connection thereof with said elongated link, and means on the other end of said cable for detachably connecting the same with the brake pedal of a towed car.

6. In a kit for converting a tow bar comprising fore and aft parts to a tow bar-brake actuator, a plurality of links adapted for connection between the ends of said two bar parts, the distance between the pivots on each link being greater than the thickness of said bar whereby said links are inclined when said bar is under tension, one of said links being elongated beyond one of its pivotal connections, an anchor block adapted for mounting on the aft part of said bar, a cable housing adapted for having one end anchored in said bar and having clamping means on the other end for detachably connecting the housing within the engine compartment of a towed vehicle, a flexible cable extending through said housing, a clevis one one end of said cable for connection with the end of said elongated link, and a hook member on the other end of said cable for connecting the same to the brake pedal of the towed vehicle.

MYRON T. BROWN.

REFERENCES CITED

The following references are of record in the file of this patent:

UNITED STATES PATENTS

| Number | Name | Date |
|---|---|---|
| 2,114,279 | Claus | Apr. 19, 1938 |
| 2,116,052 | Turpin | May 3, 1938 |
| 2,149,624 | Owen | Mar. 7, 1939 |
| 2,235,340 | Stuart | Mar. 18, 1941 |
| 2,267,029 | Heyer | Dec. 23, 1941 |
| 2,354,268 | McNamara | July 25, 1944 |

FOREIGN PATENTS

| Number | Country | Date |
|---|---|---|
| 463,249 | Great Britain | Mar. 23, 1937 |